(12) United States Patent
Park et al.

(10) Patent No.: US 9,369,337 B2
(45) Date of Patent: Jun. 14, 2016

(54) ELECTRONIC PATCH DEVICE, NETWORK SYSTEM, AND OPERATION METHOD IN NETWORK SYSTEM

(75) Inventors: Heon Hwan Park, Hwaseong-si (KR); Ki Won Lee, Hwaseong-si (KR); Yong Ok Kim, Hwaseong-si (KR); Ki Hyun Ahn, Hwaseong-si (KR); Seung Jae Lee, Hwaseong-si (KR)

(73) Assignee: SAMSUNG SDS CO., LTD., Seoul (KR)

( * ) Notice: Subject to any disclaimer, the term of this patent is extended or adjusted under 35 U.S.C. 154(b) by 387 days.

(21) Appl. No.: 13/060,370

(22) PCT Filed: Jul. 14, 2010

(86) PCT No.: PCT/KR2010/004568
§ 371 (c)(1),
(2), (4) Date: Feb. 23, 2011

(87) PCT Pub. No.: WO2011/019144
PCT Pub. Date: Feb. 17, 2011

(65) Prior Publication Data
US 2012/0127856 A1    May 24, 2012

(30) Foreign Application Priority Data
Aug. 13, 2009 (KR) ........................ 10-2009-0074592

(51) Int. Cl.
*H04L 12/24* (2006.01)
*H04L 12/933* (2013.01)
*H04L 12/46* (2006.01)

(52) U.S. Cl.
CPC ............ *H04L 41/0668* (2013.01); *H04L 49/15* (2013.01); *H04L 12/4625* (2013.01)

(58) Field of Classification Search
USPC ......... 370/220, 221, 225, 227, 228, 241, 244, 370/248; 714/1, 2, 3, 4.1, 4.2, 4.11, 4.12, 714/4.21
See application file for complete search history.

(56) References Cited

U.S. PATENT DOCUMENTS 3,783,198 A * 1/1974 Couch ........................... 379/382
5,568,525 A * 10/1996 de Nijs et al. ................. 375/356

(Continued)

FOREIGN PATENT DOCUMENTS

CN         1567889 A      1/2005
CN       101127588 A      2/2008

(Continued)

OTHER PUBLICATIONS

Shore Microsystems, data sheet for SM-27XX™ series, 1985, Shore Microsystems, whole document.*

(Continued)

*Primary Examiner* — Hanh N Nguyen
*Assistant Examiner* — Jose Perez
(74) *Attorney, Agent, or Firm* — Sughrue Mion, PLLC

(57) ABSTRACT

Provided are an electronic patch device, network system, and operation method in the network system. The network system includes n (n is a natural number equal to or greater than 1) network equipments, a backup network equipment used for backing up one of the n network equipments, n terminals connected to the n network equipments respectively, and a distributor connecting respective lines between the n network equipments and the n terminals and replacing one of the n network equipments with the backup network equipment according to necessity. Here, a plurality of the distributors are connected in parallel.

14 Claims, 8 Drawing Sheets

(56) References Cited

U.S. PATENT DOCUMENTS

| | | |
|---|---|---|
| 6,199,110 B1 | 3/2001 | Rizvi et al. |
| 6,202,170 B1* | 3/2001 | Busschbach et al. ............ 714/11 |
| 6,266,335 B1 | 7/2001 | Bhaskaran |
| 2003/0161260 A1* | 8/2003 | Murugan .................. H04J 3/08 370/217 |
| 2004/0153701 A1* | 8/2004 | Pickell .............................. 714/4 |
| 2005/0022056 A1 | 1/2005 | Risi |
| 2005/0220563 A1 | 10/2005 | Kosidlo, IV et al. |
| 2006/0143583 A1* | 6/2006 | Diab et al. ......................... 716/4 |
| 2006/0209676 A1* | 9/2006 | Chen .............................. 370/216 |
| 2007/0025240 A1* | 2/2007 | Snide ............................. 370/217 |
| 2008/0215910 A1* | 9/2008 | Gabriel et al. ..................... 714/4 |
| 2009/0059803 A1* | 3/2009 | Phaltankar .................... 370/244 |
| 2009/0212859 A1* | 8/2009 | Lesso et al. .................... 330/127 |
| 2009/0249114 A1* | 10/2009 | Tsukada et al. ................... 714/4 |
| 2009/0323517 A1* | 12/2009 | Elam et al. .................... 370/218 |
| 2010/0020680 A1* | 1/2010 | Salam et al. ................... 370/225 |
| 2010/0066765 A1* | 3/2010 | Lee ................................. 345/690 |
| 2010/0142368 A1* | 6/2010 | Gunukula et al. ............. 370/217 |
| 2010/0177644 A1* | 7/2010 | Kucharczyk ................. 370/250 |
| 2011/0041002 A1* | 2/2011 | Saavedra ........................... 714/4 |

FOREIGN PATENT DOCUMENTS

| | | |
|---|---|---|
| JP | 06209351 A * | 7/1994 |
| JP | 20038678 A | 1/2003 |
| KR | 10-2007-069630 A | 7/2007 |
| WO | 2006/131437 A2 | 12/2006 |

OTHER PUBLICATIONS

European Search Report dated Feb. 27, 2014, issued in corresponding application No. EP 10 80 8293.

* cited by examiner

ELECTRONIC PATCH DEVICE, NETWORK SYSTEM, AND OPERATION METHOD IN NETWORK SYSTEM

CROSS-REFERENCE TO RELATED APPLICATION

This application is the National Stage of International Application No. PCT/KR2010/004568, filed Jul. 14, 2010, and claims priority to and the benefit of Korean Patent Application No. 2009-0074592, filed Aug. 13, 2009, the disclosure of which is incorporated herein by reference in its entirety.

BACKGROUND

1. Field of the Invention

The present invention relates to an electronic patch device, network system, and operation method in the network system, and more particularly, to a network system having backup equipment in preparation for a fault of network equipment to operate without interruption and an operation method in the network system.

2. Discussion of Related Art

In general, the information and communication field is under rapid development mainly based on local area networks (LANs) and the Internet. In particular, a huge number of personal computers (PCs) that have proliferated since the mid-1980s have shown capabilities in a variety of application fields, such as data processing, database management, word processing, plant control, and email, in offices, plants, laboratories, etc. of public institutions or companies. To cope with the demand for information processing in such a variety of fields, computers are prepared in all departments, and connected with each other to construct a network environment, which has naturally become a trend.

As many objects, such as office automation (OA) and factory automation (FA), have been achieved using computers on the basis of such a network, tasks need to be processed rapidly and accurately, and respective companies establish intranets to increase work efficiency using clients and a server. Also, with the progress of FA, a great number of production facilities and control facilities have increased productivity and management efficiency using networks. However, due to an increase in the number of clients accessing a server, production facilities, etc. and the advent of various applications, network environments managed by respective companies have become very complicated, and many difficulties have occurred in network management whereby the network environments are maintained.

FIG. 1 illustrates a constitution of a general network system.

Referring to FIG. 1, the network system includes a server farm 10, a server farm switch 20, a distribution switch 30, a terminal switch 40, and a terminal 50.

The server farm 10 includes a plurality of servers, and is configured with primary servers and secondary servers in a dual structure.

The server farm switch 20 is a network switch connected to the respective servers of the server farm 10, and configured in a dual structure.

The distribution switch 30 is a network switch connected between the server farm switch 20 and the terminal switch 40 to relay data and signals, and configured in a dual structure. In some network systems, the server farm switch 20 or the distribution switch 30 is used for both functions.

The terminal switch 40 is a network switch connected to the terminal 50, and configured in a single structure.

FIG. 2 illustrates connection in a conventional network system.

Referring to FIG. 2, the conventional network system has a structure in which a terminal switch 40 and a terminal 50 are connected through an I-shaped patch panel 60.

As shown in FIGS. 1 and 2, in the conventional network system, the server farm 10, the server farm switch 20, and the distribution switch 30 are implemented in a dual structure. Thus, even when a fault occurs, the network can be operated using preliminary equipment without interruption. Also, when a part of the network needs a task to modify the constitution, configuration, etc. of the network, the constitution, configuration, etc. of the network can be modified using preliminary equipment without interruption.

However, the number of the terminal switches 40 and the number of the terminals 50 are far more than the number of the server farm switches 20 and the number of the distribution switches 30, and significant cost is required to dualize their structures. Also, terminals are not standardized and have a variety of characteristics. For these reasons, it is difficult to dualize the structures of the terminal switches 40 and the terminals 50. Thus, there is no remedy but to implement the terminal switches 40 and the terminals 50 in single structures, and communication is interrupted when a fault occurs in the terminal switches 40. In this way, when the whole network system stops operating due to a fault of the terminal switches 40, communication is interrupted until the terminal switches 40 are normalized. Consequently, a problem may occur in production during the interruption time, causing huge loss in productivity.

SUMMARY OF THE INVENTION

The present invention is directed to providing a network system in which terminal switches are configured in a dual structure to maintain communication without interruption even when a fault occurs in the terminal switches.

The present invention is also directed to providing a network system in which terminal switches are configured in a dual structure, and thus modification can be completed with communication maintained without interruption even when the terminal switches require a modification task.

The present invention is also directed to providing an electronic patch device performing a backup operation following occurrence of a fault between both of a network switch and backup network switch and a terminal.

The present invention is also directed to providing an operation method of a network system including the electronic patch device.

The present invention is also directed to providing a network system having economic efficiency in a network constitution in comparison with a 1:1 network backup system constitution.

The present invention is also directed to providing a method of dualizing a terminal network which cannot be configured in a dual structure according to conventional art using a single local area network (LAN) card.

One aspect of the present invention provides a network system including: n (n is a natural number equal to or greater than 1) network equipments; a backup network equipment used for backing up one of the n network equipments; n terminals connected to the n network equipments, respectively; and a distributor connecting respective lines between the n network equipments and the n terminals, and replacing one of the n network equipments with the backup network equipment according to necessity. Here, a plurality of the distributors are connected in parallel.

The distributor may be an electronic patch device connecting the respective lines between the n network equipments and the n terminals, and monitoring operation states of the n network equipments to switch from a network equipment in which a fault has occurred to the backup network equipment.

The electronic patch device may include: a network equipment access unit including n ports for accessing the n network equipments; a backup network equipment access unit for accessing the backup network equipment; a terminal access unit including n ports for accessing the n terminals; a first signal detector for detecting a signal output from the network equipment; a switch for switching from the network equipment to the backup network equipment with the network equipment connected with the terminal, or, reversely, from the backup network equipment to the network equipment with the backup network equipment connected with the terminal; and a controller reading the signal from the first signal detector to determine whether or not a fault has occurred in the network equipments, and controlling the switch to switch from the network equipment in which the fault has occurred to the backup network equipment.

The electronic patch device may further include a second signal detector for detecting a signal output from the backup network equipment, and the controller may read the signal from the second signal detector to determine whether or not a fault has occurred in the backup network equipment.

When it is determined that a fault has occurred in the backup network equipment, the controller may control the switch to switch from the backup network equipment to the network equipment.

The electronic patch device may further include a power fault bypass switch switching to directly connect the network equipments and the terminals when a fault has occurred in power supplied to the electronic patch device.

The electronic patch device may further include: a first circuit protector for preventing an abnormal state such as overvoltage of signals transmitted and received by the network equipments; a second circuit protector for preventing an abnormal state such as overvoltage of signals transmitted and received by the terminals; and a third circuit protector for preventing an abnormal state such as overvoltage of signals transmitted and received by the backup network equipment.

The electronic patch device may further include a reverse signal blocker for blocking a signal reversely applied from a transmission line for transmitting a signal from the network equipments or the backup network equipment to the terminals.

The electronic patch device may further include: a first output signal amplifier for amplifying the signal output from the network equipment and transferring the amplified signal to the first signal detector; and a second output signal amplifier for amplifying the signal output from the backup network equipment and transferring the amplified signal to the second signal detector.

The switch may include: a first switch connected to an ingress port of the terminal access unit; and a second switch connected to an egress port of the terminal access unit.

The network equipments may include a network switch.

The backup network equipment may include a network switch.

The distributor may include a hub.

The first signal detector may detect a link signal and link pulse signal output from the network equipments, and the controller may determine whether or not a fault has occurred in the network equipments using the link signal and the link pulse signal read from the first signal detector.

The second signal detector may detect a link signal and link pulse signal output from the backup network equipment, and the controller may determine whether or not a fault has occurred in the backup network equipment using the link signal and the link pulse signal read from the second signal detector.

The first circuit protector, the second circuit protector, or the third circuit protector may be a transformer.

The power fault bypass switch, the first switch, or the second switch may be configured in a relay structure.

A plurality of the electronic patch devices may be connected in parallel.

The electronic patch device may include a plurality of modules including all the components of the electronic patch device and separately operating. Here, when some of the a plurality of modules are changed, the respective plurality of modules may separately operate not to influence the other modules.

Dual power may be supplied to the electronic patch device.

Another aspect of the present invention provides an electronic patch device including: a network equipment access unit including n ports for accessing n network equipments; a backup network equipment access unit for accessing a backup network equipment for backing up the network equipments; a terminal access unit including n ports for accessing n terminals; a first signal detector for detecting a signal output from the network equipment access unit; a switch for switching from the network equipment access unit to the backup network equipment access unit with the network equipment access unit and the terminal access unit connected, or, reversely, from the backup network equipment access unit to the network equipment access unit with the backup network equipment access unit and the terminal access unit connected; and a controller reading the signal from the first signal detector to determine whether or not a fault has occurred in the network equipments, and controlling the switch to switch from the network equipment access unit accessing a network equipment in which a fault has occurred to the backup network equipment access unit.

The electronic patch device may further include a second signal detector for detecting a signal output from the backup network equipment access unit, and the controller may read the signal from the second signal detector to determine whether or not a fault has occurred in the backup network equipment.

When it is determined that a fault has occurred in the backup network equipment, the controller may control the switch to switch from the backup network equipment to the network equipments.

The electronic patch device may further include a power fault bypass switch switching to directly connect the network equipment access unit and the terminal access unit when a fault has occurred in power supplied to the electronic patch device.

The electronic patch device may further include: a first circuit protector for preventing an abnormal state such as overvoltage of signals transmitted and received by the network equipment access unit; a second circuit protector for preventing an abnormal state such as overvoltage of signals transmitted and received by the terminal access unit; and a third circuit protector for preventing an abnormal state such as overvoltage of signals transmitted and received by the backup network equipment access unit.

The electronic patch device may further include a reverse signal blocker for blocking a signal reversely applied from a transmission line for transmitting a signal from the network equipments or the backup network equipment to the terminals.

The electronic patch device may further include: a first output signal amplifier for amplifying the signal output from the network equipment access unit and transferring the amplified signal to the first signal detector; and a second output signal amplifier for amplifying the signal output from the backup network equipment access unit and transferring the amplified signal to the second signal detector.

The switch may include: a first switch connected to an ingress port of the terminal access unit; and a second switch connected to an egress port of the terminal access unit.

The network equipments or the backup network equipment may include a network switch.

The first signal detector may detect a link signal and link pulse signal output from the network equipment access unit, and the controller may determine whether or not a fault has occurred in the network equipments using the link signal and the link pulse signal read from the first signal detector.

The second signal detector may detect a link signal and link pulse signal output from the backup network equipment access unit, and the controller may determine whether or not a fault has occurred in the backup network equipment using the link signal and the link pulse signal read from the second signal detector.

The first circuit protector, the second circuit protector, or the third circuit protector may be a transformer.

The power fault bypass switch, the first switch, or the second switch may be configured in a relay structure.

Still another aspect of the present invention provides an operation method in a network system including: starting to check states of ports of the corresponding network equipment according to a predetermined sequence; determining whether or not a fault has occurred in the ports using a signal output from the network equipment; when it is determined that a fault has occurred in a port of the network equipment (referred to as a "current port"), checking whether or not there is another port in which a fault has occurred (referred to as a "faulty port") among the other ports; when there is no faulty port, switching from the current port to a backup port connected to a backup network equipment; when there is a faulty port, comparing a priority of the current port and that of the faulty port; and when the current port has a higher priority than the faulty port, switching from the current port to the backup port.

Determining whether or not a fault has occurred in the ports using the signal output from the network equipment may include: checking whether or not a link signal is detected from the network equipment; when no link signal is detected from the network equipment, checking whether or not a link pulse signal is detected from the network equipment; when no link pulse signal is detected from the network equipment, checking whether the current port is the backup port; and when the current port is not the backup port, determining that a fault has occurred in the current port.

Determining whether or not a fault has occurred in the ports using a signal output from the network equipment may further include: when a link signal is detected from the network equipment, checking whether the current port is the last port; and starting to check the next port when the current port is not the last port, and finishing all operations when the current port is the last port.

Determining whether or not a fault has occurred in the ports using a signal output from the network equipment may further include, when a link signal is detected from the network equipment, turning on a light-emitting unit corresponding to the network equipment.

Determining whether or not a fault has occurred in the ports using a signal output from the network equipment may further include: when a link pulse signal is detected from the network equipment, checking whether the current port is the last port; and starting to check the next port when the current port is not the last port, and finishing all operations when the current port is the last port.

Determining whether or not a fault has occurred in the ports using a signal output from the network equipment may further include, when a link pulse signal is detected from the network equipment, turning on a light-emitting unit corresponding to the network equipment.

Determining whether or not a fault has occurred in the ports using a signal output from the network equipment may further include, when the current port is the backup port, connecting all the ports to a non-backup network switch port.

Determining whether or not a fault has occurred in the ports using a signal output from the network equipment may further include, when the current port is the backup port, turning on light-emitting units corresponding to all the ports.

The operation method may further include, when there is no faulty port, switching from the current port to the backup port.

The operation method may further include, when there is no faulty port, turning on a light-emitting unit corresponding to the current port.

The operation method may further include, after switching from the current port to the backup port when the current port has a higher priority than the faulty port, checking whether the current port is the last port, starting to check the next port when the current port is not the last port, and finishing all operations when the current port is the last port.

The operation method may further include, when the current port has a higher priority than the faulty port, connecting the faulty port to a non-backup network switch port.

The operation method may further include, when the current port has a lower priority than the faulty port, turning off a light-emitting unit corresponding to the current port.

BRIEF DESCRIPTION OF THE DRAWINGS

The above and other objects, features and advantages of the present invention will become more apparent to those of ordinary skill in the art by describing in detail exemplary embodiments thereof with reference to the attached drawings, in which.

DETAILED DESCRIPTION OF EXEMPLARY EMBODIMENTS

Hereinafter, exemplary embodiments of the present invention will be described in detail. However, the present invention is not limited to the embodiments disclosed below, but can be implemented in various forms. The following embodiments are described in order to enable those of ordinary skill in the art to embody and practice the present invention.

Figure 1:
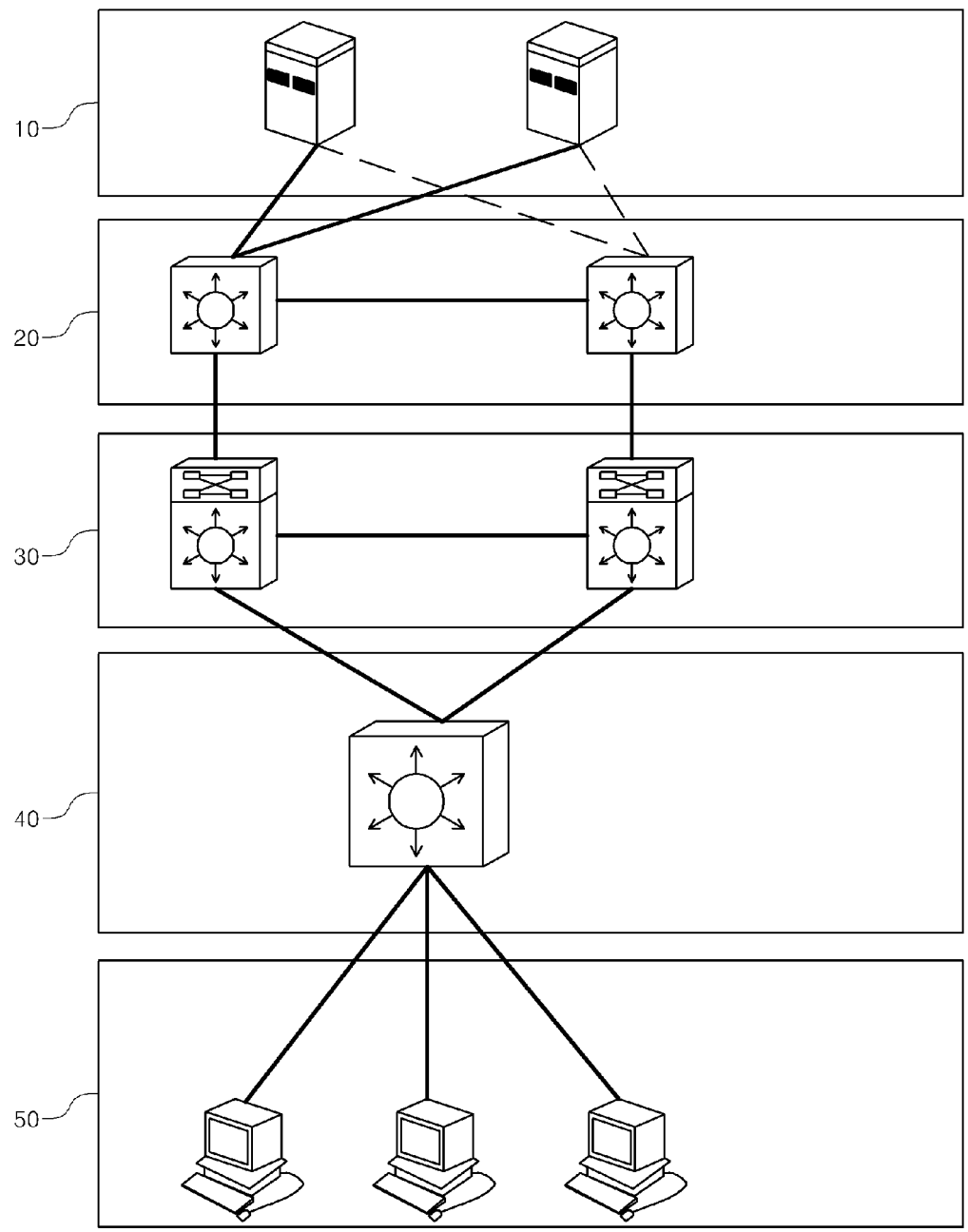
FIG. 1 illustrates a constitution of a general network system.
Figure 2:
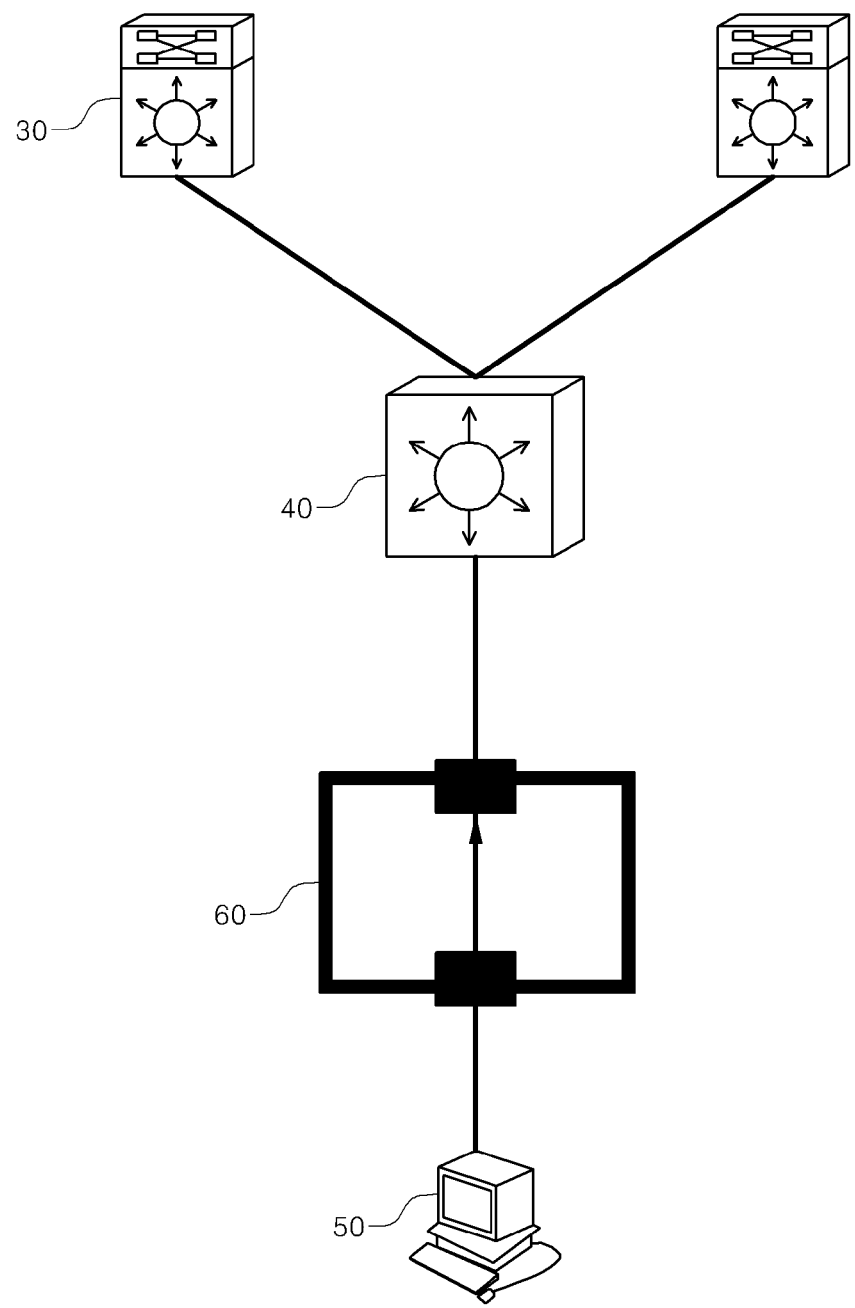
FIG. 2 illustrates connection in a conventional network system.
Figure 3:
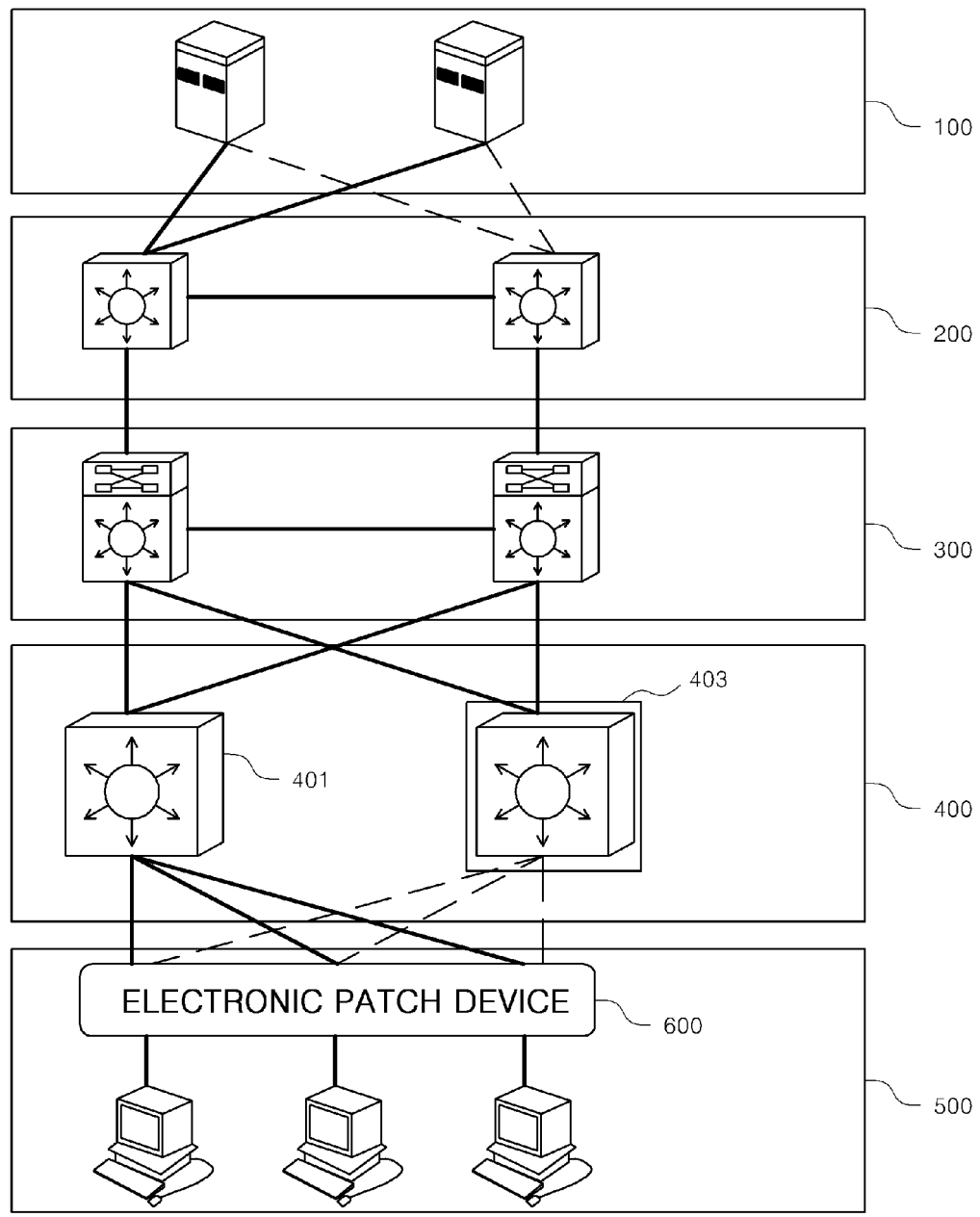
FIG. 3 illustrates a constitution of a network system according to an exemplary embodiment of the present invention.

FIG. 3 illustrates a constitution of a network system according to an exemplary embodiment of the present invention.

Referring to FIG. 3, the network system includes a server farm 100, a server farm switch 200, a distribution switch 300, a terminal switch 400, a terminal 500, and an electronic patch device 600.

The server farm 100 includes a plurality of servers and is configured with primary servers and secondary servers in a dual structure.

The server farm switch 200 is a network switch connected to the respective servers of the server farm 100, and configured in a dual structure.

The distribution switch 300 is a network switch connected between the server farm switch 202 and the terminal switch 402 to relay data and signals, and configured in a dual structure.

The terminal switch 400 is a network switch connected to the terminal 500, and configured in a dual structure. To be specific, the terminal switch 400 includes a network switch 401 and a backup network switch 403. Although FIG. 3 shows only one network switch, there can be a plurality of network switches in an exemplary embodiment of the present invention. In other words, it is possible to implement an n:1 backup network system including n (n is a natural number equal to or greater than 1) network switches and one backup network switch. The n:1 backup network system will be described in detail later.

Figure 4:
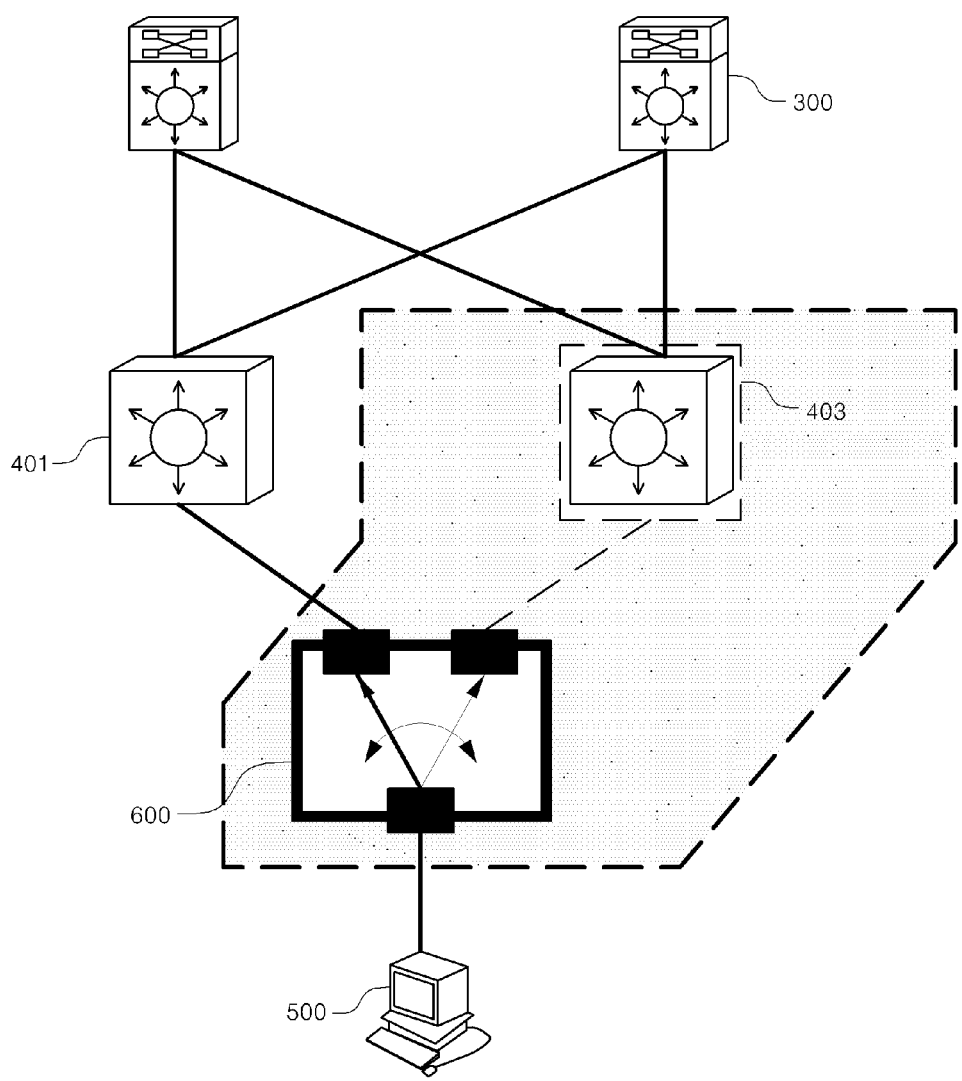
FIG. 4 illustrates connection in a network system according to an exemplary embodiment of the present invention.

FIG. 4 illustrates connection in a network system according to an exemplary embodiment of the present invention.

Referring to FIG. 4, the network switch 401 and the backup network switch 403 are connected with the terminal 500 through the electronic patch device 600. Normally, the network switch 401 and the terminal 500 are connected through the electronic patch device 600. However, when it becomes impossible to communicate through the network switch 401 due to a fault in the network switch 401, etc., the electronic patch device 600 switches to connect the backup network switch 403 and the terminal 500 according to a control signal. FIG. 4 is a simplified view of a network system illustrating an electronic patch device, and an exemplary embodiment of the present invention provides an n:1 backup network system in which n network switches and one backup network switch are connected.

Figure 5:
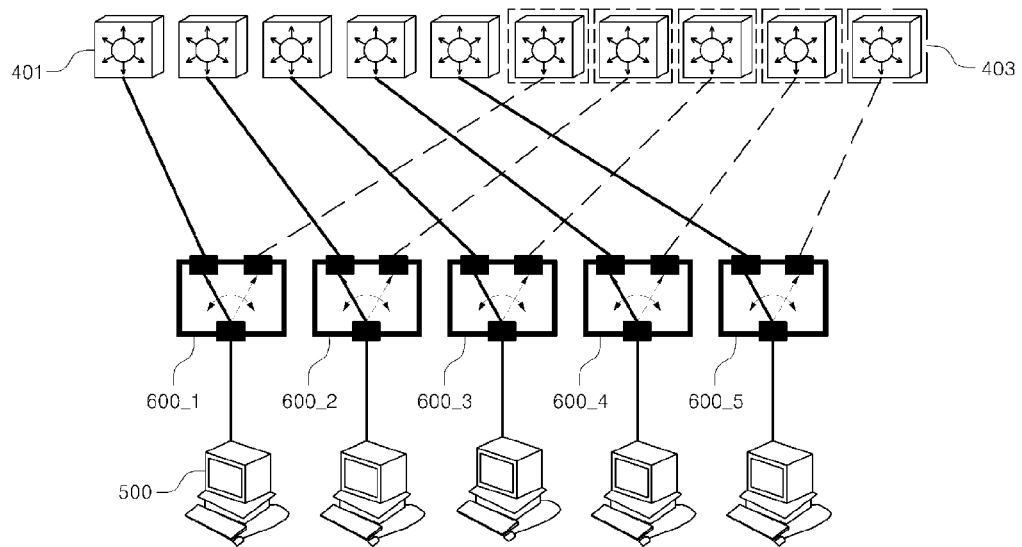
FIG. 5 illustrates an ideal backup method in a network system.

FIG. 5 illustrates an ideal backup method in a network system.

Referring to FIG. 5, a 1:1 backup network system is shown. In other words, in the system, five backup network switches 403 corresponding to five network switches 401 are prepared, and five electronic panel devices 600_1. 600_2, . . . , and 600_5 are prepared to switch between the network switches 401 and the backup network switches 403, respectively.

In the structure of FIG. 5, terminals 500 are connected to the network switches 401 or the backup network switches 403 through the electronic panel devices 600_1 to 600_5, respectively. In other words, the backup system has a 1:1 structure. In such a network system, even when faults simultaneously occur at one or more network switches 401, the respective electronic panel devices switch from the network switches 401 to backup network switches 403. For this reason, the network system can be called an ideal network system. However, faults rarely occur at two or more network equipments at the same time, and it is very inefficient to implement a backup network system in the 1:1 structure. Also, a 1:1 backup network system requires double or more the implementation cost of a conventional network system, and is not a cost-effective system. Thus, an exemplary embodiment of the present invention proposes a method of implementing a backup network system by connecting a plurality of network switches and one backup network switch to one electronic patch device. In other words, an n:1 backup network switch employing n network switches and one backup network switch is proposed.

Figure 6:
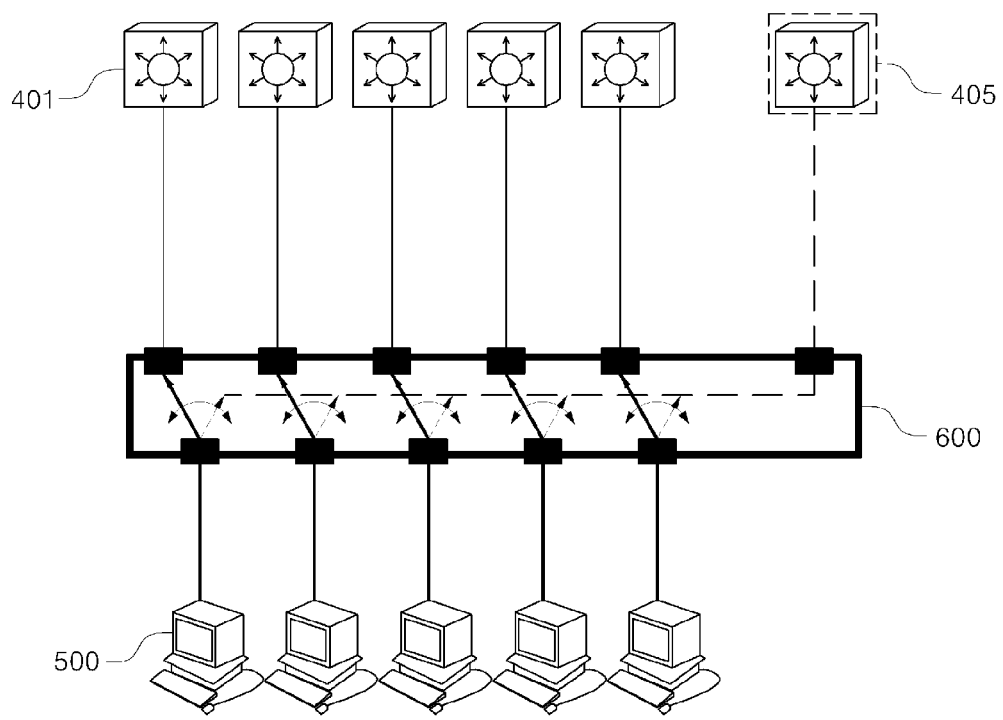
FIG. 6 illustrates a backup method in a network system according to an exemplary embodiment of the present invention.

FIG. 6 illustrates a backup method in a network system according to an exemplary embodiment of the present invention.

Referring to FIG. 6, the network system includes five network switches 401, a backup network switch 405, terminals 500, and an electronic patch device 600.

There are the five network switches 401 in FIG. 6. However, this is merely an exemplary embodiment, and there can be various numbers of network switches 401. Also, in the exemplary embodiment of FIG. 6, the network switches 401 and the backup network switch 405 are shown as examples of network equipment. However, this is merely an exemplary embodiment, and a variety of network equipments can be employed.

The backup network switch 405 is used for backing up the network switches 401.

The terminals 500 are five in number, and connected to the corresponding network switches 401 through the electronic patch device 600, respectively.

The electronic patch device 600 serves to connect respective lines between the five network switches 401 and the five terminals 500, and switch one of the five network switches 401 to the backup network switch 405 according to necessity. In the exemplary embodiment of FIG. 6, the electronic patch device 600 is used as a distributor. However, this is merely an exemplary embodiment, and a variety of distributors performing the same function can be employed. For example, a hub can be used as a distributor instead of the electronic patch device 600.

In an exemplary embodiment of the present invention, the electronic patch device 600 connects respective lines between the five network switches 401 and the five terminals 500, and monitors operation states of the five network switches 401 to switch from a network switch 401 in which a fault has occurred to the backup network switch 405. In an exemplary embodiment of the present invention, a plurality of electronic patch devices can be connected in parallel. The electronic patch device 600 will be described in detail with reference to FIG. 7.

Figure 7:
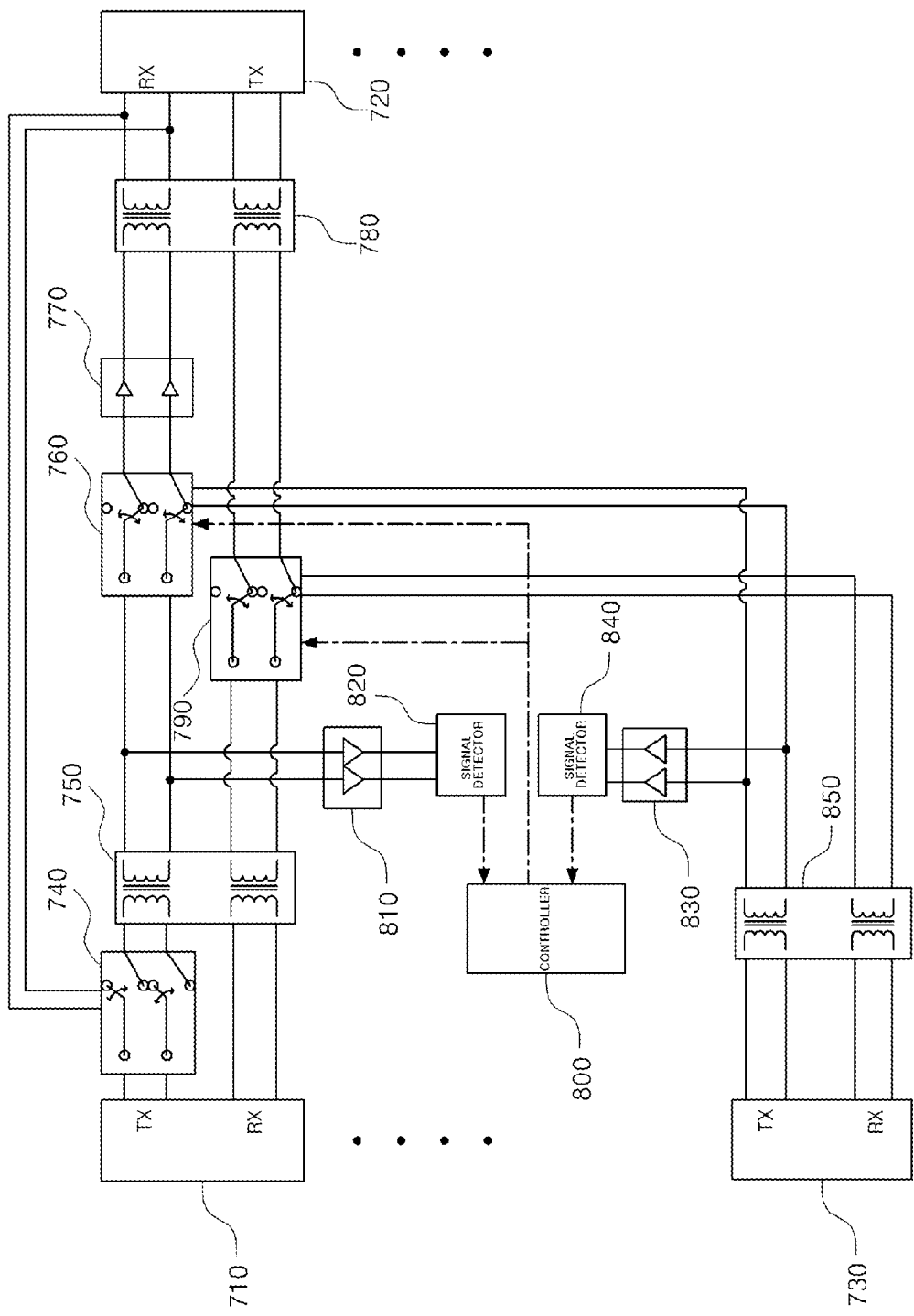
FIG. 7 is a circuit diagram of an electronic patch device according to an exemplary embodiment of the present invention.

FIG. 7 is a circuit diagram of an electronic patch device according to an exemplary embodiment of the present invention.

Referring to FIG. 7, the electronic patch device includes a network equipment access unit 710, a terminal access unit 720, a backup network equipment access unit 730, a power fault bypass switch 740, a first circuit protector 750, a first switch 760, a reverse signal blocker 770, a second circuit protector 780, a second switch 790, a controller 800, a first output signal amplifier 810, a first signal detector 820, a second output signal amplifier 830, a second signal detector 840, and a third circuit protector 850.

The network equipment access unit 710 includes n ports for accessing n network equipments. In an exemplary embodiment of the present invention, a network equipment may include a network switch. The network equipment access unit 710 includes an egress port Tx and an ingress port Rx. As shown in FIG. 7, each transmission line applied to alternating current (AC) is implemented by two lines.

The terminal access unit 720 includes n ports for accessing n terminals 500.

The backup network equipment access unit 730 includes ports for accessing a backup network equipment. In an exemplary embodiment of the present invention, a backup network equipment may include a backup network switch.

The power fault bypass switch 740 switches to directly connect the network equipment access unit 710 and the terminal access unit 720 when a failure occurs in power supplied to the electronic patch device. In an exemplary embodiment of the present invention, the power fault bypass switch 740 can be implemented in a relay structure.

The first circuit protector 750 serves to prevent an abnormal operation including overvoltage of signals transmitted and received by the network equipment access unit 710. In an exemplary embodiment of the present invention, the first circuit protector 750 may include a transformer.

The second circuit protector 780 serves to prevent an abnormal operation including overvoltage of signals transmitted and received by the terminal access unit 720. In an exemplary embodiment of the present invention, the second circuit protector 750 may include a transformer.

The third circuit protector 850 serves to prevent an abnormal operation including overvoltage of signals transmitted and received by the backup network equipment access unit 730. In an exemplary embodiment of the present invention, the third circuit protector 850 may include a transformer.

The first switch 760 is connected to an ingress port Rx of the terminal access unit 720, and serves to switch from the network equipment access unit 710 to the backup network equipment access unit 730 with the network equipment access unit 710 and the terminal access unit 720 connected or, reversely, from the backup network equipment access unit 730 to the network equipment access unit 710 with the backup network equipment access unit 730 and the terminal access unit 720 connected. In an exemplary embodiment of the present invention, the first switch 760 can be implemented in a relay structure.

The second switch 790 is connected to an egress port Tx of the terminal access unit 720, and serves to switch from the network equipment access unit 710 to the backup network equipment access unit 730 with the network equipment access unit 710 and the terminal access unit 720 connected or, reversely, from the backup network equipment access unit 730 to the network equipment access unit 710 with the backup network equipment access unit 730 and the terminal access unit 720 connected. In an exemplary embodiment of the present invention, the second switch 790 can be implemented in a relay structure.

The reverse signal blocker 770 serves to block a signal reversely applied from a transmission line for transmitting a signal from the network equipment access unit 710 or the backup network equipment access unit 730 to the terminal access unit 720, and amplify a signal.

The controller 800 reads a signal from the first signal detector 820 to determine whether or not a fault has occurred in a network equipment, and controls the first switch 760 and the second switch 790 to switch from the network equipment access unit 710 accessing a network equipment in which a fault has occurred to the backup network equipment access unit 730.

The first output signal amplifier 810 serves to amplify a signal output from the network equipment access unit 710 and transfer the amplified signal to the first signal detector 820.

The second output signal amplifier 830 serves to amplify a signal output from the backup network equipment access unit 730 and transfer the amplified signal to the second signal detector 840.

The first signal detector 820 serves to detect a signal output from the network equipment access unit 710. In an exemplary embodiment of the present invention, the controller 800 reads a signal from the first signal detector 820, thereby determining whether or not a fault has occurred in a network equipment.

The second signal detector 840 serves to detect a signal output from the backup network equipment access unit 730. In an exemplary embodiment of the present invention, the controller 800 reads a signal from the second signal detector 840, thereby determining whether or not a fault has occurred in a backup network equipment. When it is determined that a fault has occurred in the backup network equipment, the controller 800 controls the first switch 760 and the second switch 790 to switch from the backup network equipment to a network equipment.

In an exemplary embodiment of the present invention, the first signal detector 820 can detect a link signal and a link pulse signal output from the network equipment access unit 710. Here, the controller 800 can determine whether or not a fault has occurred in a network equipment using the link signal and the link pulse signal read from the first signal detector 820.

In an exemplary embodiment of the present invention, the second signal detector 840 can detect a link signal and a link pulse signal output from the backup network equipment access unit 730. Here, the controller 800 can determine whether or not a fault has occurred in the backup network equipment using the link signal and the link pulse signal read from the second signal detector 840.

Figure 9:
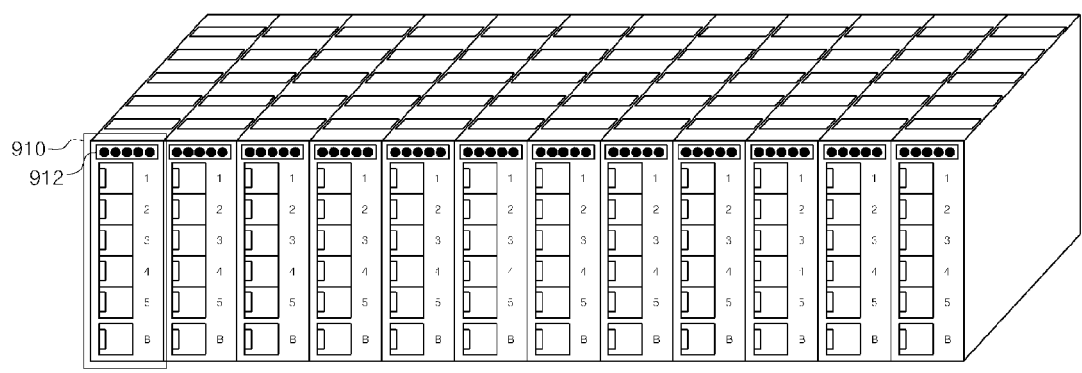
FIG. 9 is an external view of an electronic patch device according to an exemplary embodiment of the present invention.

FIG. 9 is an external view of an electronic patch device according to an exemplary embodiment of the present invention.

Referring to FIG. 9, an electronic patch device 600 includes a plurality of modules 910 including all the components of the electronic patch device 600 and separately operating.

In the exemplary embodiment of FIG. 9, the modules 910 include a first port 1, a second port 2, a third port 3, a fourth port 4, a fifth port 5, and a backup port B. However, this is merely an exemplary embodiment, and the number or positions of ports can be variously implemented. FIG. 9 shows the electronic patch device 600 including a total of 12 modules. Also, the modules 910 have light-emitting units 912 denoting states of the respective ports. In an exemplary embodiment of the present invention, the light-emitting units 912 can be implemented by light-emitting diodes (LEDs).

In the electronic patch device 600 according to an exemplary embodiment of the present invention, when some of the a plurality of modules 910 are changed, the respective plurality of modules may separately operate not to influence the other modules.

Also, dual power may be supplied to the electronic patch device 600. For this reason, even when a problem occurs in power supply for some reason, the other power which normally operates is continuously supplied, and the electronic patch device 600 can be stably operated without interruption. Further, a stable network system environment can be constructed.

Figure 8:
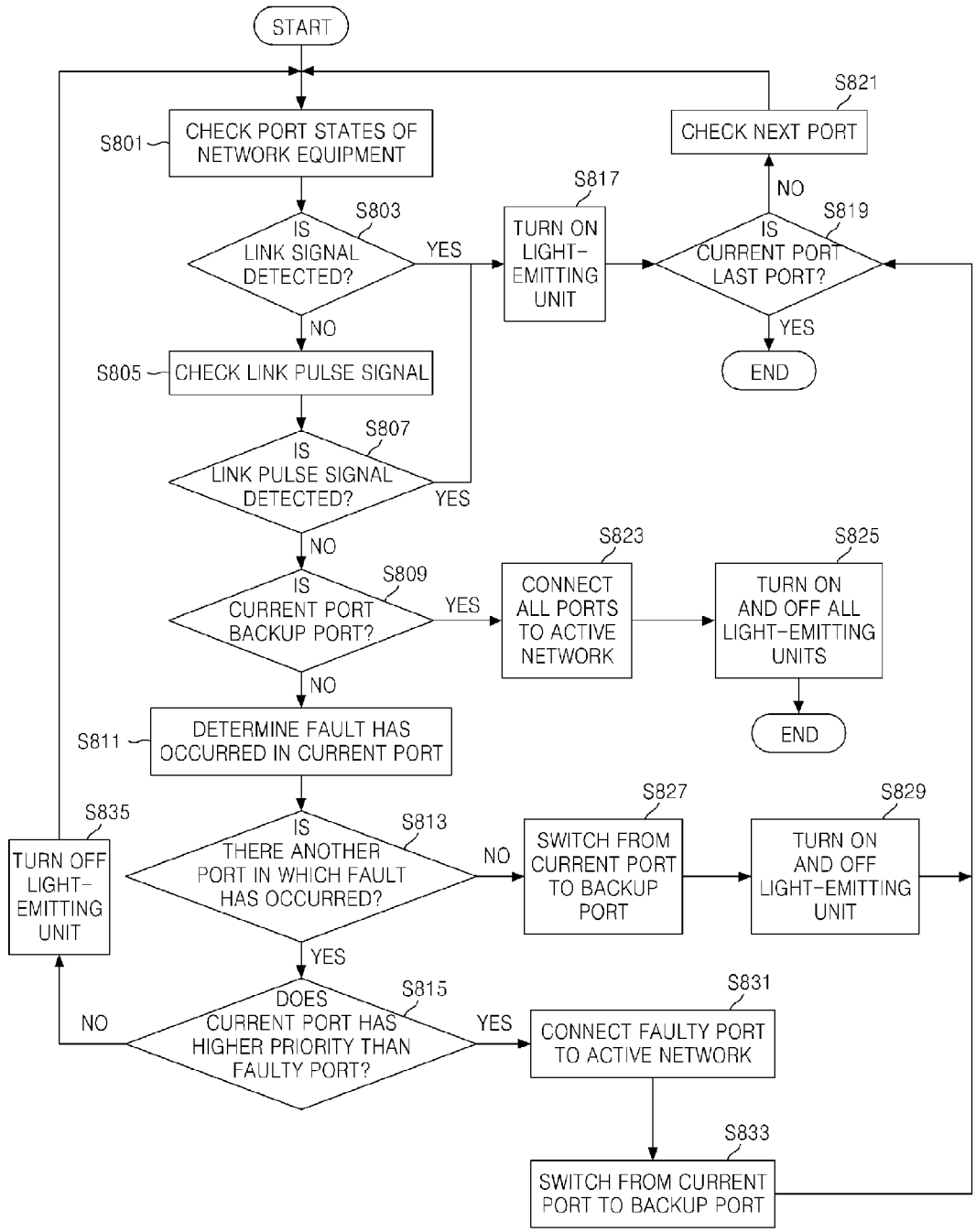
FIG. 8 is a flowchart illustrating an operation method in a network system according to an exemplary embodiment of the present invention.

FIG. 8 is a flowchart illustrating an operation method in a network system according to an exemplary embodiment of the present invention.

According to a predetermined sequence, checking of port states of the corresponding network equipment is started (S801).

It is checked whether or not a link signal is detected from the network equipment (S803).

When no link signal is detected from the network equipment, it is checked whether a link pulse signal is detected from the network equipment (S805).

It is checked whether or not a link pulse signal is detected from the network equipment (S807), and it is checked whether a port of the network equipment (referred to as a "current port") is a backup port connected to a backup network equipment (S809).

When the current port is not the backup port, it is determined that a fault has occurred in the current port (S811).

When it is determined that a fault has occurred in the current port, it is checked whether or not there is another port in which a fault has occurred (referred to as a "faulty port") among other ports (S813).

When there is no faulty port, the current port is switched to a backup port (S827), and a light-emitting unit 912 corresponding to the current port is turned on and off (S829). On the other hand, when there is a faulty port, a priority of the current port and that of the faulty port are compared (S815).

When the current port has a higher priority than the faulty port, the faulty port is connected to a non-backup network switch port (S831), and the current port is switched to the backup port (S833). Subsequently, it is checked whether the current port is the last port (S819). All operations are finished when the current port is the last port, and checking of the next port is started when the current port is not the last port (S821).

When the current port has a lower priority than the faulty port, the light-emitting unit 912 corresponding to the current port is turned off (S835), and checking of the next port continues.

When a link signal is detected in step 803, the light-emitting unit 912 corresponding to the current port is turned on (S817), and it is checked whether the current port is the last port (S819). All operations are finished when the current port is the last port, and checking of the next port is started when the current port is not the last port (S821).

When a link pulse signal is detected in step 807, the light-emitting unit 912 corresponding to the current port is turned on (S817), and it is checked whether the current port is the last port (S819). All operations are finished when the current port is the last port, and checking of the next port is started when the current port is not the last port (S821).

When it is checked in step 809 that the current port is the backup port, all ports are connected to the non-backup network switch port (S823), and all light-emitting units 912 are turned on and off (S825).

In the exemplary embodiment of FIG. 8, the light-emitting units 912 denote port states, and can indicate a normal state, a switch state, a faulty state, etc. by emitting light or not. The on/off operation or flickering operation of the light-emitting units 912 described in FIG. 8 may be performed in various ways according to exemplary embodiments. In an exemplary embodiment of the present invention, the light-emitting units 912 can be implemented by LEDs.

In exemplary embodiments of the present invention, a backup network switch equipment is prepared for a fault of a network switch equipment, so that a system can keep operating without communication interruption even when a fault occurs in a network equipment such as a switching equipment. Thus, it is possible to improve efficiency of production facilities.

Also, since network switches are configured in a dual structure according to exemplary embodiments of the present invention, a modification can be completed with communication maintained without interruption even when the network switches require the modification work. Thus, it is possible to improve efficiency of production facilities.

Further, an n:1 backup network system is implemented according to exemplary embodiments of the present invention, so that installation cost can be remarkably reduced in comparison with a 1:1 network backup system.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. An operation method in a network system, comprising:

starting to check states of ports of network equipments connected to n (n is a natural number equal to or greater than 1) terminals, respectively, according to a predetermined sequence;

determining whether a fault has occurred in a current port of a network equipment among the ports of the network equipments using a signal output from the network equipment and transmitted to a terminal corresponding to the network equipment, the signal indicating an operation state of the network equipment, and generating a control signal based on the signal output from the network equipment and transmitted to the terminal corresponding to the network equipment when it is determined that a fault has occurred in the current port of the network equipment;

when it is determined that a fault has occurred in the current port of the network equipment, checking whether there is a faulty port in which a fault has occurred among the other ports of the ports;

when there is no faulty port among the other ports, switching from the current port to a backup port connected to a backup network equipment according to the control signal;

when there is a faulty port among the other ports, comparing a priority of the current port and that of the faulty port; and when the current port has a higher priority than the faulty port, switching from the current port to the backup port according to the control signal, wherein the priority of the current port when it is determined that a fault has occurred in the current port is the same as the priority of the current port when it is determined that a fault has not occurred in the current port.

2. The operation method of claim 1, wherein the determining whether a fault has occurred in a current port of network equipment using a signal output from the network equipment comprises:

checking whether a link signal is detected from the network equipment;

when no link signal is detected from the network equipment, checking whether a link pulse signal is detected from the network equipment;

when no link pulse signal is detected from the network equipment, checking whether the current port is the backup port; and when the current port is not the backup port, determining that a fault has occurred in the current port.

3. The operation method of claim 2, wherein the determining of whether a fault has occurred in a current port of network equipment using a signal output from the network equipment further comprises:

checking whether the current port is a last port when a link signal is detected from the network equipment; and starting to check a next port when the current port is not the last port.

4. The operation method of claim 3, wherein the determining whether a fault has occurred in a current port of network equipment using a signal output from the network equipment further comprises, when a link signal is detected from the network equipment, turning on a light-emitting unit corresponding to the network equipment.

5. The operation method of claim 2, wherein the determining whether a fault has occurred in a current port of network equipment using a signal output from the network equipment further comprises:

when a link pulse signal is detected from the network equipment, checking whether the current port is a last port; and starting to check a next port when the current port is not the last port.

6. The operation method of claim 5, wherein the determining whether a fault has occurred in a current port of network equipment using a signal output from the network equipment further comprises, when a link pulse signal is detected from the network equipment, turning on a light-emitting unit corresponding to the network equipment.

7. The operation method of claim 2, wherein the determining whether a fault has occurred in a current port of network equipment using a signal output from the network equipment further comprises, when the current port is the backup port, switching a connection of the current port to a connection of a non-backup network switch port.

8. The operation method of claim 7, wherein the determining whether a fault has occurred in a current port of network equipment using a signal output from the network equipment further comprises, when the current port is the backup port, turning on light-emitting units corresponding to all the ports.

9. The operation method of claim 1, further comprising, when there is no faulty port among the other ports, switching from the current port to the backup port.

10. The operation method of claim 9, further comprising, when there is no faulty port among the other ports, turning on a light-emitting unit corresponding to the current port.

11. The operation method of claim 1, further comprising, after switching from the current port to the backup port when the current port has a higher priority than the faulty port, checking whether the current port is a last port, and starting to check a next port when the current port is not the last port.

12. The operation method of claim 1, further comprising, when the current port has a higher priority than the faulty port, connecting the faulty port to a non-backup network switch port.

13. The operation method of claim 1, further comprising, when the current port has a lower priority than the faulty port, turning off a light-emitting unit corresponding to the current port.

14. The operation method of claim 1, wherein the ports include n (n is a natural number equal to or greater than 1) ports for accessing n network equipments, the n network equipments connecting to n terminals in a one to one correspondence, the operation method further comprising:

when a fault occurs in one of the n network equipments, performing an n:1 backup operation of switching from the network equipment in which the fault has occurred to the backup network equipment.

* * * * *